(12) United States Patent
Young et al.

(10) Patent No.: US 6,712,392 B2
(45) Date of Patent: Mar. 30, 2004

(54) AUTOMOTIVE FRAME ASSEMBLY

(75) Inventors: Chris Sean Young, Plymouth, MI (US); Henry J Cornille, Jr., Farmington Hills, MI (US); Joseph Porcari, Canton, MI (US); Michael William Danyo, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,057

(22) Filed: Jun. 5, 2002

(65) Prior Publication Data
US 2003/0227164 A1 Dec. 11, 2003

(51) Int. Cl.[7] ................................................ B62D 21/02
(52) U.S. Cl. ..................................... 280/781; 180/311
(58) Field of Search ............................... 280/781, 785, 280/797; 180/311; 29/897.2

(56) References Cited

U.S. PATENT DOCUMENTS

| 2,136,122 | A | * | 11/1938 | Almdale ................... 280/797 |
|---|---|---|---|---|
| 2,173,515 | A | * | 9/1939 | Eklund ..................... 280/794 |
| 2,173,525 | A | * | 9/1939 | Wallace .................... 280/796 |
| 2,177,991 | A | * | 10/1939 | Maddock ................... 280/794 |
| 2,467,516 | A | * | 4/1949 | Almdale .................... 219/94 |
| 2,627,426 | A | * | 2/1953 | Toncray et al. ............ 280/781 |
| 2,728,587 | A | * | 12/1955 | McKinley ................... 280/797 |
| 2,784,983 | A | * | 3/1957 | Dean ........................ 280/797 |
| 2,838,322 | A | * | 6/1958 | Felts et al. ................ 280/800 |
| 3,088,749 | A | * | 5/1963 | Schilberg .................. 280/792 |
| 3,264,010 | A | * | 8/1966 | Pierce ...................... 280/792 |
| 4,735,355 | A | | 4/1988 | Browning |
| 5,308,115 | A | | 5/1994 | Ruehl et al. |
| 5,332,281 | A | | 7/1994 | Janotik et al. |
| 6,138,358 | A | | 10/2000 | Marando |
| 6,299,210 | B1 | * | 10/2001 | Ruehl et al. ............... 280/800 |
| 6,354,654 | B2 | * | 3/2002 | Lee ........................... 296/204 |

FOREIGN PATENT DOCUMENTS

| JP | 2000190745 A | * | 7/2000 | ......... B60K/15/063 |
|---|---|---|---|---|
| WO | WO 98/08722 | | 3/1998 | |
| WO | WO 98/08725 | | 3/1998 | |

* cited by examiner

Primary Examiner—Charles T. Jordan
Assistant Examiner—John W. Zerr
(74) Attorney, Agent, or Firm—Gigette Bejin

(57) ABSTRACT

A method for manufacturing an automotive frame assembly (10) includes an inner rail (12) having an exterior side (26) and an interior side (30). First, the exterior side (26) of the inner rail (12) has fixedly attached thereto at least one flange (24) extending from a cross member (20). At least one two-sided fastener (28) is operatively applied to the exterior side (26) and the interior side (30) of the inner rail (12) so as to fixedly attach the flange (24) to the inner rail (12). Thereafter, the interior side (30) of the inner rail (12) has fixedly attached thereto at least one lip (32) extending from an outer rail (12″). Likewise, at least one two-sided fastener (28) is operatively applied to the exterior side (26) and the interior side (30) of the inner rail so as to fixedly attach the lip (32) to the inner rail (12).

14 Claims, 4 Drawing Sheets

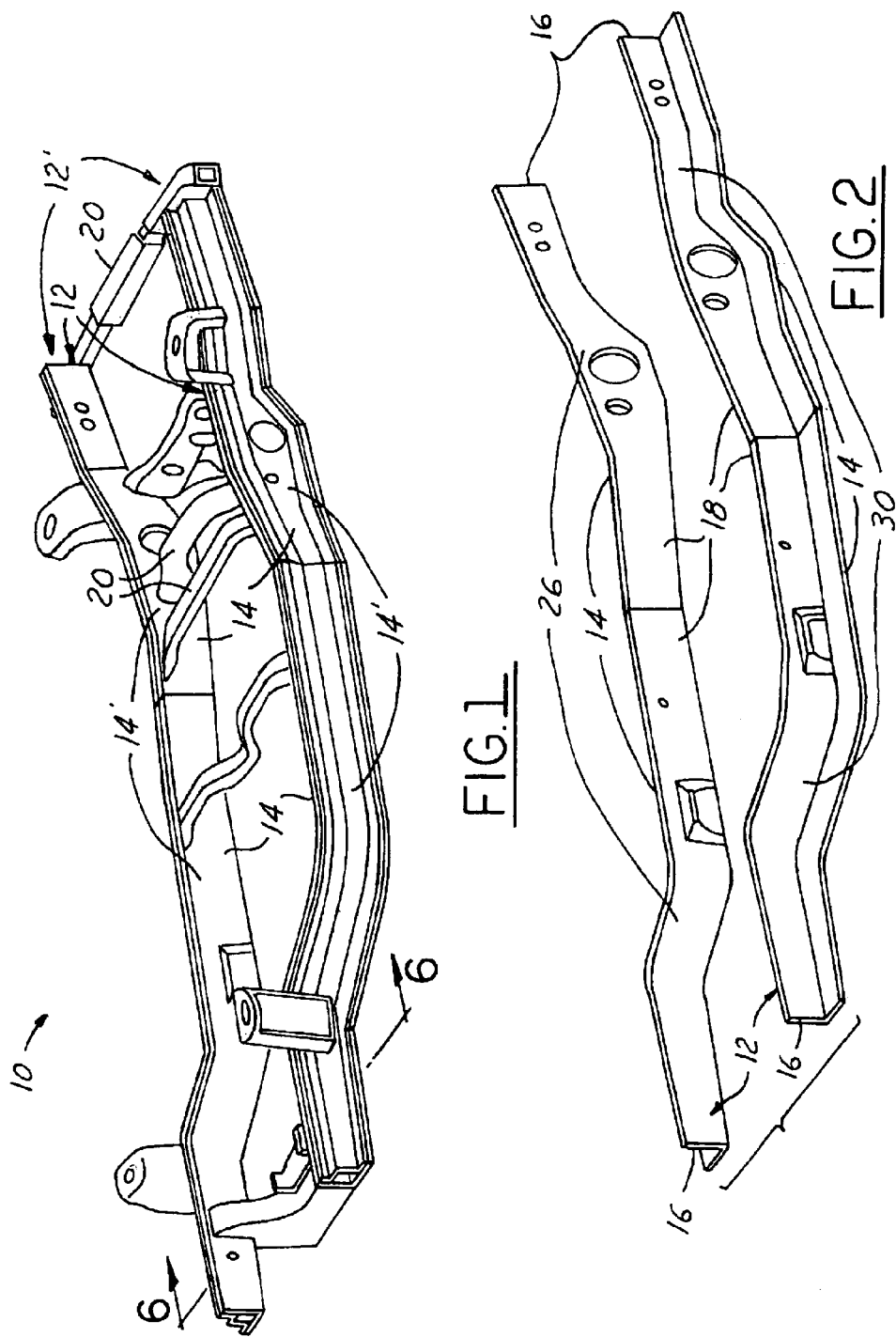

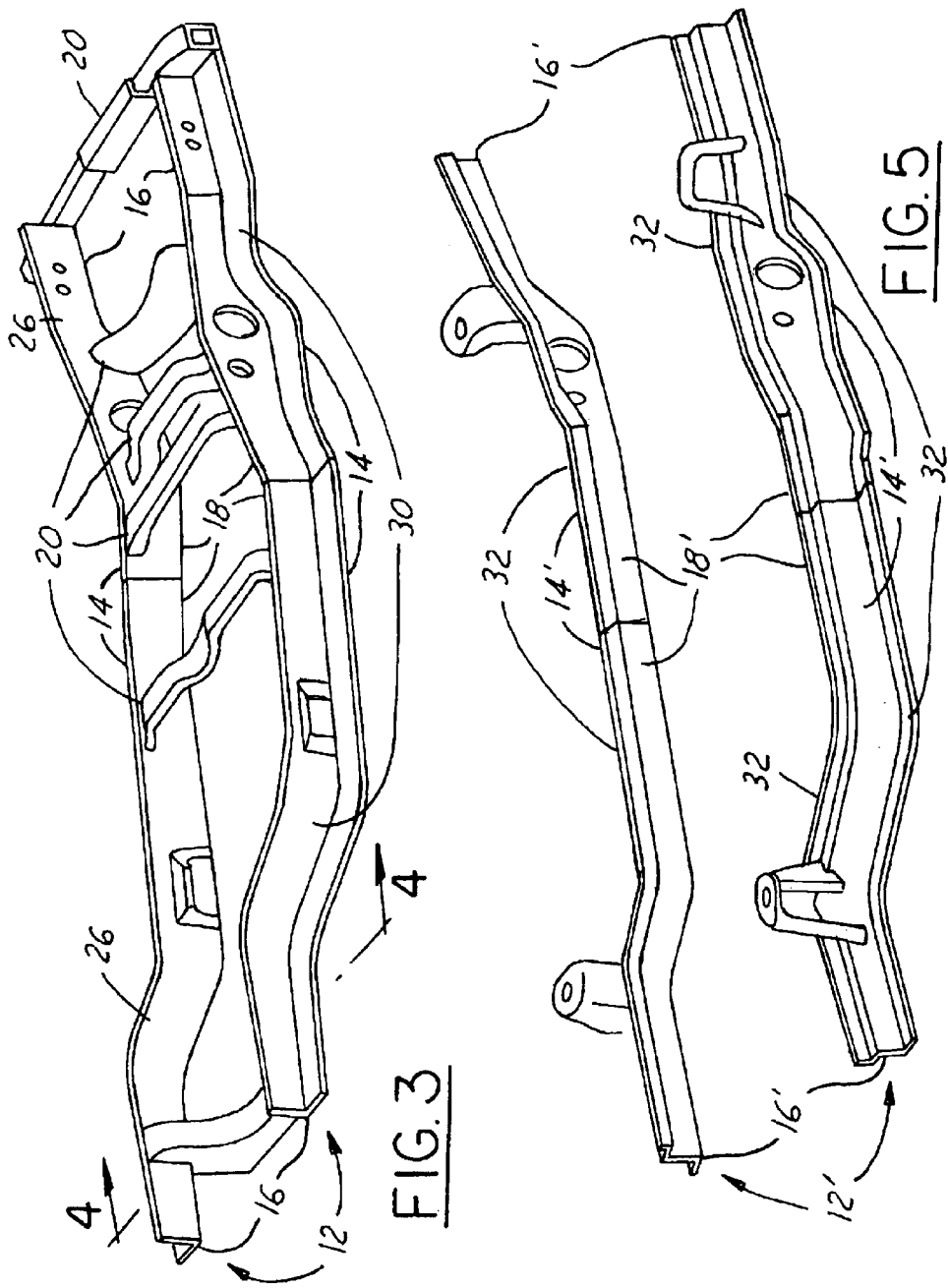

AUTOMOTIVE FRAME ASSEMBLY

FEDERAL RESEARCH STATEMENT

The invention described herein was funded in part by a grant from the Partnership For the Next Generation Vehicles program, Contract No. AC05-960R22464. The United States Government may have certain rights under the invention.

BACKGROUND OF THE INVENTION

1. Technical Field

The present invention relates generally to automotive vehicles, and more particularly to automotive frame assemblies and a method for manufacturing the same that employs fasteners requiring two-sided access for installation.

2. Background of the Invention

Structures of existing automotive frame assemblies ("frame assemblies") and existing methods for manufacturing the same require substantial fusion welding of individual rail components and cross members to effectuate their assembly. The extensive use of fusion welding results in lengthy manufacturing cycle time.

A typical frame assembly includes at least one metal inner rail with at least one metal outer rail fixedly coupled thereto. Each rail is usually in the form of a stamped C-section. The inner rail and the outer rail are typically mated together in order to create a single rail in the form of a closed box beam.

In this typical construction, the inner rail and the outer rail are first stitched together by adjoining surfaces therebetween and then subsequently MIG welding at fixed distances. As is known in the art, MIG welding along entire lengths of adjoining surfaces assists in stabilizing dimensional requirements of the frame assembly. Thereafter, the remaining gaps along adjoining edges are typically MIG welded together. In comparison to resistance spot welding and self-piercing rivets, MIG welding may take about 30%–40% longer to fasten mating components together. Thus, the fusion welding process results in a lengthy manufacturing cycle time of these frame assemblies.

After the inner and outer rails have been joined, they are typically positioned in a fixture in a parallel configuration. The rails have a plurality of metal cross members positioned therebetween and perpendicular thereto. Each end of the cross members may have an L-bracket fusion welded thereto. Each L-bracket is then typically fusion welded to its respective rail thus creating the frame assembly.

The fusion welding typically transfers a substantial amount of heat to the metal components of the frame assembly. It is known in the art that certain metals are more susceptible to thermal expansion than others depending upon their respective coefficients of thermal expansion. Consequently, sufficient heat may be transferred to the metal components thereby increasing the size of the metal components. The increase in size during manufacture of the frame assembly may result in a construction that is beyond the design tolerances.

For example, aluminum metal may not be used in existing frame assemblies using current methods of frame assembly construction because its coefficient of thermal expansion is sufficiently high so as to cause the frame assembly upon completion of its manufacture to be outside the design tolerances. The inability to incorporate aluminum in frame assemblies is clearly unfortunate in view of several advantages offered by aluminum vehicular components. It is widely known that the use of aluminum components in automotive vehicles decreases the weight of the vehicle thereby improving fuel economy, emissions, and vehicle performance.

Further, the typical sequence in manufacturing a frame assembly impedes access to portions of the frame during manufacture thereof. For example, forming the rail in the shape of a closed box beam before the attachment of the cross members thereto prevents the use of two-sided fastening methods. The construction of the closed box beam obstructs access to the inner sides of the rail. Consequently, self-piercing rivets, resistance spot welding, and various other two-sided fastening methods typically may not be used to attach the cross members to the rails.

Moreover, the construction of the rail in the form of a closed box beam (opposing C-sections) prevents the subsequent reinforcement of the inner sides thereof.

Therefore, a need exists to provide a frame assembly and a method of manufacture thereof that reduces cycle time of manufacture, improves access to components during manufacture, and allows for dimensional stability.

SUMMARY OF INVENTION

The present invention provides an automotive frame assembly ("frame assembly") and a method for manufacturing the same that employs fasteners requiring two-sided access for installation therein so as to reduce the manufacturing cycle time without hindering compliance within the dimensional requirements.

There is disclosed herein a method for manufacturing an automotive frame assembly. The method includes providing an inner rail having an exterior side and an interior side. The inner rail has at least one flange fixedly attached thereto such that it extends from an end of a cross member. At least one two-sided fastener is operatively applied to the exterior side and the interior side of the inner rail so as to fixedly attach the flange to the inner rail. Thereafter, the inner rail has fixedly attached thereto at least one lip extending from an outer rail. Likewise, at least one two-sided fastener is operatively applied to the exterior side and the interior side of the inner rail so as to fixedly attach the lip to the inner rail.

One advantage of the present invention is that two-sided fasteners may be used to attach components of the frame assembly together. Another advantage of the present invention is that manufacturing cycle time is reduced. Still another advantage of the present invention is that dimensional control is provided despite the reduction in manufacturing cycle time.

Other advantages of the present invention will become apparent when viewed in light of the detailed description of the preferred embodiment when taken in conjunction with the attached drawings and appended claims.

BRIEF DESCRIPTION OF DRAWINGS

FIG. 1 is a perspective view generally illustrating an automotive frame assembly according to a preferred embodiment of the present invention;

FIG. 2 is a perspective view of a pair of opposing inner rails according to a preferred embodiment of the present invention;

FIG. 3 is a perspective view of a plurality of cross members attached to a pair of opposing inner rails according to a preferred embodiment of the present invention;

FIG. 5 is a perspective view of a pair of opposing outer rails according to a preferred embodiment of the present invention;

DETAILED DESCRIPTION

Figure 4:
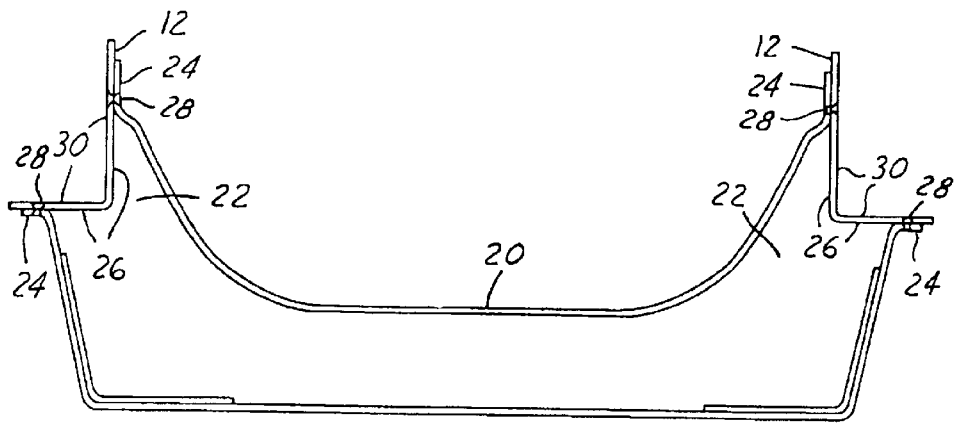
FIG. 4 is a cross-sectional view of the cross member and the pair of opposing inner rails as shown in FIG. 3, taken along line 4—4.

In the following figures, the same reference numerals are used to identify the same components in the various views.

Referring to FIG. 1, there is generally illustrated a perspective view of an automotive frame assembly 10 ("frame assembly") according to a preferred embodiment of the present invention. The elements of the frame assembly 10 are discussed in detail in the descriptions for FIGS. 2 through 6.

Referring now to FIG. 2, there is shown a perspective view of a pair of opposing inner rails 12 according to a preferred embodiment of the present invention. The frame assembly 10 preferably includes two opposing inner rails 12. Each inner rail 12 is typically composed of at least two inner sub-rails 14, each having an outer portion 16 and a mating portion 18. The mating portions 18 of the two inner sub-rails 14 are fixedly coupled to each other so as to form the inner rail 12.

Figure 6:
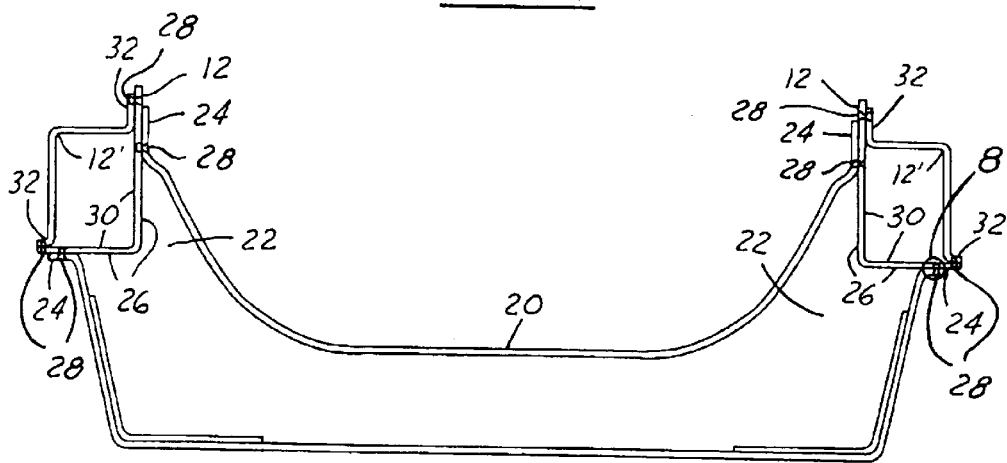
FIG. 6 is a cross-sectional view of an the automotive frame assembly as shown in FIG. 1, taken along line 6—6.
Figure 8:
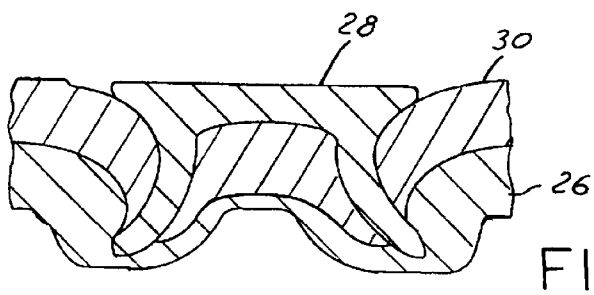
FIG. 8 is an enlarged view of a conventional self-piercing rivet.

The mating portions 18 typically are fusion welded together. However, a plurality of two-sided fasteners 28 or a variety of other fasteners may be used as desired. A two-sided fastener 28 requires access to both sides of the component receiving the fastener. For example, as best shown in FIGS. 4 and 6, a fastener applicator requires access to both sides of each inner sub-rail 14 for applying self-piercing rivets thereto. The inner sub-rail 14 is disclosed in further detail in the description for FIG. 4.

Turning now to FIG. 3, there is illustrated a perspective view of a pair of opposing inner rails 12 having a plurality of cross members 20 attached thereto, according to a preferred embodiment of the present invention. Each cross member 20 has opposing ends 22 preferably with at least one flange 24 extending therefrom (FIG. 4). The flange 24 preferably engages an exterior side 26 of the respective inner rail 12.

FIG. 4 best illustrates the attachment of the flange 24 of the cross member 20 to the exterior side 26 of the inner rail 12. FIG. 4 shows a cross-sectional view of the inner rails 12 and the cross member 20 as shown in FIG. 3, taken along line 4—4. The flanges 24 of the cross member 20 are mated to the respective exterior sides 26 of the opposing inner rails 12 and protrude from the frame assembly 10 so as to allow a fastener applicator to apply at least one two-sided fastener 28 thereto. A plurality of two-sided fasteners 28 preferably attach the flanges 24 to the respective the inner rail 12.

The inner rails 12 are preferably formed so as to allow for the ready access of a fastener applicator to both an interior side 30 and the exterior side 26 of the inner rail 12. Access to both sides 26, 30 of the inner rail 12 is required for the application of the two-sided fastener 28 thereto. For example, the inner rail 12 may have an L-shaped cross-section to permit the application of resistance spot welding to both the exterior side 26 and the interior side 30 of the inner rail 12. Of course, self-piercing rivets and other two-sided fasteners 28 may be employed as desired. Further, it is also clear that other cross-sectional forms of the inner sub-rails 14 may be employed so as to permit access to both sides 26, 30 of the inner rail 12.

In an alternative embodiment of the present invention, a reinforcement (not shown) is fixedly coupled to the interior side 30 of the inner rail 12. As is known in the art, the reinforcement increases the strength of the inner rail 12.

Turning now to FIG. 5, there is illustrated a pair of opposing outer rails 12' according to a preferred embodiment of the present invention. Each outer rail 12' is typically composed of at least two outer sub-rails 14', each having an external portion 16' and an engaging portion 18'. The engaging portions 18' of two outer sub-rails 14' are fixedly coupled together so as to form the outer rail 12'. Typically, the engaging portions 18' are fusion welded together. Of course, two-sided fasteners and various other fasteners may be employed to attach the engaging portions 18' together.

Turning now to FIG. 6, there is illustrated a cross-sectional view of the frame assembly 10 as shown in FIG. 1, taken along line 6—6. Each outer sub-rail 14' also has at least one lip 32 extending therefrom for mating to the interior side 30 of the inner sub-rail 14. The lip 32 and the interior side 30 of the inner sub-rail 14 protrude from the frame assembly 10 so as to permit a fastener applicator to have access to both the lip 32 and the inner sub-rail 14. Thus, the fastener applicator may apply a two-sided fastener 28 thereto.

For example, the outer sub-rail 14' may have a lip 32 extending perpendicularly therefrom that mates with the interior side 30 of the inner sub-rail 14 so as to permit the application of resistance spot welding to the lip 32 and the inner sub-rail 14. Of course, self-piercing rivets and other two-sided fasteners 28 may be used as desired. Further, it is also clear that other cross-sectional forms of the outer sub-rails 14 may be employed to allow for access to both sides 26, 30 of the inner rail 12.

Preferably, all of the components integrated within the frame assembly 10 are composed of an aluminum material. As is known in the art, the use of aluminum material in automotive vehicles decreases the weight of the vehicle thereby improving fuel economy, emissions, and vehicle performance.

The aluminum components are preferably secured together within dimensional requirements by employing the two-sided fasteners 28 at predetermined points along adjoining surfaces of mating components. The two-sided fasteners 28 fixedly couple together aluminum components of the frame assembly 10 without transferring excessive heat to the aluminum material.

As is known in the art, aluminum has a sufficiently high coefficient of thermal expansion so as to cause aluminum materials to increase in size if subjected to excessive heat typically experienced during the manufacture of aluminum assemblies. For example, substantial fusion welding of aluminum components may transfer excessive heat to the aluminum components thereby causing the aluminum components to increase in size. The increase in size during manufacture may result in construction of the assembly beyond design tolerances. Since typical two-sided fasteners 28 typically do not transfer excessive heat to the components, dimensional control of the frame assembly 10 is preserved.

Further, the intermittent application of the two-sided fasteners 28 along adjoining surfaces of the components reduces the cycle time of manufacture. The cycle time is reduced because only certain predetermined points along adjoining surfaces require the application of fasteners thereto.

Of course, it is clear that various kinds of material other than aluminum may also be used as desired for the components of the frame assembly 10. For example, coated steel may be used in the frame assembly 10, especially for receiving self-piercing rivets.

Figure 7:
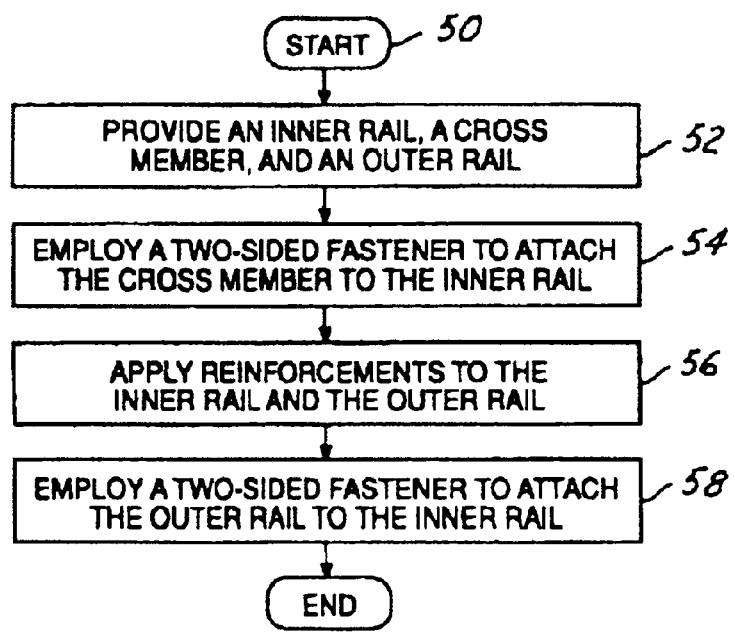
FIG. 7 is a flow chart representing a method of manufacturing an automotive assembly according to a preferred embodiment of the present invention.

Referring now to FIG. 7, a flow chart illustrates a method for manufacturing a frame assembly according to a preferred embodiment of the present invention. The manufacturing operation is commenced at step 50 and immediately proceeds to step 52. In step 52, a pair of opposing inner rails 12, at least one cross member 20, and a pair of opposing outer rails 12' are provided with the structural requirements described in FIGS. 2 through 6. The sequence then proceeds to step 54.

In step 54, a flange 24 extending from the cross member 20 is fixedly coupled to an exterior side 26 of the inner rail 12. Preferably, an epoxy adhesive is first used to tack the flange 24 to the exterior side 26 of the inner rail 12. Then, a fastener applicator simultaneously accesses both the exterior side 26 and an interior side 30 of the inner rail 12 so as to apply a two-sided fastener 28 to the flange 24 and the inner rail 12. The two-sided fasteners 28 may include a self-piercing rivet attachment, a resistance-spot welding attachment or other two-sided attachments as desired. Then, the sequence proceeds to step 56.

In step 56, a reinforcement may be fixedly coupled to the interior side 30 of the inner rail 12. Likewise, a reinforcement may be added to the outer rail 12' as desired. Of course, the reinforcements may also be integrated within the inner rail 12 and the outer rail 12' at any time period prior to step 56, if so desired. The sequence then proceeds to step 58.

In step 58, a lip 32 extending from the outer rail 12' is fixedly coupled to the interior side 30 of the inner rail 12. Preferably, an epoxy is first used to tack the outer rail 12' to the interior side 30 of the inner rail 12. Then, a fastener applicator simultaneously accesses both the interior side 30 and the exterior side 26 of the inner rail 12 so as to apply a two-sided fastener 28 to the lip 32 and the inner rail 12. Similar to step 54, the two-sided fasteners 28 may include a self-piercing rivet attachment, a resistance-spot welding attachment, or other two-sided attachments 28 as desired.

While particular embodiments of the invention have been shown and described, numerous variations and alternate embodiments will occur to those skilled in the art. Accordingly, it is intended that the invention be limited only in terms of the appended claims.

What is claimed is:

1. A method for manufacturing an automotive frame assembly, the method comprising the steps of:

providing an inner rail;

providing an opposing inner rail;

providing a cross member having a first end and a second end;

fastening said first end of said cross member to said inner rail;

fastening said second end of said cross member to said opposing inner rail;

providing outer rail;

providing an opposing outer rail;

fastening said outer rail to said inner rail; and fastening said opposing outer rail to said opposing inner rail;

wherein the step of fastening said first end of said cross member to said inner rail comprises simultaneously accessing an exterior side and an interior side of said inner rail so as to employ a two-sided fastener;

wherein the step of fastening said second end of said cross member to said opposing inner rail comprises simultaneously accessing an opposing exterior side and an opposing interior side of said opposing inner rail so as to employ said two-sided fastener.

2. The method as recited in claim 1 wherein the step of fastening said first end of said cross member to said inner rail comprises first tacking said first end to said inner rail and then employing said two-sided fastener to attach said first end to said inner rail.

3. The method as recited in claim 1 wherein the step of fastening said outer rail to said inner rail comprises simultaneously accessing an exterior side and an interior side of said inner rail so as to employ a two-sided fastener.

4. The method as recited in claim 3 wherein the step of fastening said outer rail to said inner rail comprises first tacking said outer rail to said inner rail and then employing said two-sided fastener to attach said outer rail to said inner rail.

5. The method as recited in claim 1 wherein the step of fastening said second end of said cross member to said opposing inner rail comprises employing said two-sided fastener to attach said second end to said opposing inner rail.

6. The method as recited in claim 1 wherein the step of fastening said opposing outer rail to said opposing inner rail comprises simultaneously accessing an opposing exterior side and an opposing interior side of said opposing inner rail so as to employ a two-sided fastener.

7. The method as recited in claim 6 wherein the step of fastening said opposing outer rail to said opposing inner rail comprises employing said two-sided fastener to attach said opposing outer rail to said opposing inner rail.

8. The method as recited in claim 1 wherein at least one of said inner rail, said outer rail, said cross member, said opposing inner rail, and said opposing outer rail is made of an aluminum material.

9. A method for manufacturing an automotive frame assembly, comprising:

providing an inner rail;

providing an opposing inner rail;

providing a cross member having a first end and a second end;

simultaneously accessing an exterior side and an interior side of at least one of said inner rail and said opposing inner rail;

fastening said first end of said cross member to said inner rail;

fastening said second end of said cross member to said opposing inner rail;

providing an outer rail;

providing an opposing outer rail;

fastening said outer rail to said inner rail; and fastening said opposing outer rail to said opposing inner rail.

10. An automotive frame assembly comprising:

an inner rail having an interior side and an exterior side;

a cross member having a first end and a second end, said first end being fixedly coupled to said exterior side of said inner rail;

an opposing inner rail having an opposing exterior side and an opposing interior side, said opposing exterior side being fixedly coupled to said second end of said cross member;

an outer rail being fixedly coupled to said interior side of said inner rail; and an opposing outer rail being fixedly coupled to said opposing interior side of said opposing inner rail;

wherein said exterior side and said interior side of said inner rail are simultaneously accessible to a fastener applicator when said outer rail and said first end of said cross member are coupled to said inner rail;

wherein said opposing exterior side and said opposing interior side of said opposing Inner rail are simultaneously accessible to a fastener applicator when said opposing outer rail and said second end of said cross member are coupled to said opposing inner rail;

wherein at least one two-sided fastener is operatively applied to said exterior side and said interior side of said inner rail so as to fixedly couple thereto at least one of said first end of said cross member and said outer rail.

11. The automotive frame assembly as recited in claim 10 wherein at least one of said inner rail, said outer rail, said cross member, said opposing inner rail, and said opposing outer rail is made of an aluminum material.

12. The automotive frame assembly as recited in claim 10 wherein at least one two-sided fastener is operatively applied to said opposing exterior side and said opposing interior side of said opposing inner rail so as to fixedly couple thereto at least one of said second end of said cross member and said opposing outer rail.

13. The automotive frame assembly as recited in claim 10 wherein said outer rail has a lip extending therefrom for attaching to said interior side of said inner rail, said opposing outer rail has an opposing lip extending therefrom for attaching to said opposing interior side of said opposing inner rail.

14. The automotive frame assembly as recited in claim 10 wherein said first end and said second end of said cross member each have a flange extending therefrom for attaching to at least one of said exterior side of said inner rail and said opposing exterior side of said opposing inner rail.

* * * * *